United States Patent
Patil et al.

(10) Patent No.: US 8,904,177 B2
(45) Date of Patent: Dec. 2, 2014

(54) AUTHENTICATION FOR A MULTI-TIER WIRELESS HOME MESH NETWORK

(75) Inventors: Abhishek Patil, San Diego, CA (US);
Xiangpeng Jing, San Diego, CA (US);
Aixin Liu, San Diego, CA (US); Djung N. Nguyen, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1172 days.

(21) Appl. No.: 12/360,771

(22) Filed: Jan. 27, 2009

(65) Prior Publication Data
US 2010/0191968 A1      Jul. 29, 2010

(51) Int. Cl.
*H04L 9/32*        (2006.01)
*H04L 9/00*        (2006.01)
*H04W 12/04*     (2009.01)
*H04W 12/06*     (2009.01)

(52) U.S. Cl.
CPC ............ *H04L 9/3271* (2013.01); *H04L 9/3236* (2013.01); *H04W 12/04* (2013.01); *H04W 12/06* (2013.01); *H04L 2209/80* (2013.01)
USPC .......................................... 713/170; 380/270

(58) Field of Classification Search
CPC . H04L 9/3271; H04L 9/3236; H04L 2209/80; H04W 12/04; H04W 12/06
USPC .......... 713/170, 152, 153, 168, 171; 370/331, 370/337; 726/1, 16, 24, 25; 703/23; 345/2, 345/3, 5, 22; 380/270
See application file for complete search history.

(56) References Cited

U.S. PATENT DOCUMENTS

| 4,890,323 A | 12/1989 | Beker et al. |
| 5,303,388 A | 4/1994 | Kreitman et al. |
| 6,061,794 A * | 5/2000 | Angelo et al. ..................... 726/3 |
| 6,260,147 B1 * | 7/2001 | Quick, Jr. ....................... 713/182 |
| 6,581,166 B1 | 6/2003 | Hirst et al. |

(Continued)

FOREIGN PATENT DOCUMENTS

| EP | 1489817 A1 | 12/2004 |
| EP | 1912147 | 4/2008 |

(Continued)

OTHER PUBLICATIONS

Shai Halevi, Public-key cryptography and password protocols, Aug. 1999, AMC Transactions on information and system security, vol. 2, No. 3, pp. 230-268.*

(Continued)

*Primary Examiner* — Abu Sholeman
(74) *Attorney, Agent, or Firm* — John L. Rogitz (57) ABSTRACT

A method for a multi-tier wireless home mesh network may include authentication of a node within a wireless home networking environment after discovering a wireless home mesh network. The authentication comprises (1) transmitting a first message, the first message including (i) an encrypted pass-phrase being a pass-phrase encrypted with a public key of the node of the wireless home mesh network, (ii) a checksum of the encrypted pass-phrase, (iii) a public key of the wireless node, and (iv) a checksum of the public key of the wireless node, and (2) receiving a second message, the second message including a code to indicate whether the wireless node has been successfully authenticated along with the challenge text verification process to ensure the message was not tampered or sent by another node.

13 Claims, 8 Drawing Sheets

(56) References Cited

U.S. PATENT DOCUMENTS

| | | | |
|---|---|---|---|
| 6,751,455 B1 | 6/2004 | Acampora | |
| 6,842,460 B1 | 1/2005 | Olkkonen et al. | |
| 6,879,574 B2 | 4/2005 | Naghian et al. | |
| 7,042,988 B2 | 5/2006 | Juitt et al. | |
| 7,069,483 B2 | 6/2006 | Gillies et al. | |
| 7,092,715 B2 | 8/2006 | Korpela et al. | |
| 7,184,767 B2 | 2/2007 | Gandolfo | |
| 7,366,113 B1 | 4/2008 | Chandra et al. | |
| 7,403,492 B2 | 7/2008 | Zeng et al. | |
| 7,408,911 B2 | 8/2008 | Joshi | |
| 7,420,940 B2* | 9/2008 | Fukui | 370/328 |
| 7,443,809 B2 | 10/2008 | Bajic | |
| 7,505,751 B1 | 3/2009 | Backes | |
| 7,554,998 B2 | 6/2009 | Simonsson et al. | |
| 7,586,888 B2 | 9/2009 | Wang | |
| 7,603,556 B2* | 10/2009 | Brown et al. | 713/169 |
| 7,623,501 B2 | 11/2009 | Rangarajan et al. | |
| 7,647,036 B2* | 1/2010 | Omae et al. | 455/411 |
| 7,822,064 B2 | 10/2010 | Thubert et al. | |
| 7,826,398 B2* | 11/2010 | Monier | 370/255 |
| 7,912,224 B2* | 3/2011 | Lee et al. | 380/278 |
| 7,961,674 B2 | 6/2011 | Jing et al. | |
| 7,966,497 B2* | 6/2011 | Gantman et al. | 713/184 |
| 7,990,897 B2 | 8/2011 | Jing et al. | |
| 8,019,995 B2* | 9/2011 | van Bemmel | 713/168 |
| 8,116,336 B2 | 2/2012 | Jing et al. | |
| 8,130,704 B2 | 3/2012 | Jing et al. | |
| 8,407,240 B2* | 3/2013 | Denton | 707/766 |
| 2002/0191793 A1* | 12/2002 | Anand et al. | 380/255 |
| 2004/0103295 A1 | 5/2004 | Gustafsson | |
| 2004/0174900 A1 | 9/2004 | Volpi et al. | |
| 2004/0174904 A1 | 9/2004 | Kim et al. | |
| 2004/0233855 A1 | 11/2004 | Gutierrez et al. | |
| 2004/0235468 A1 | 11/2004 | Luebke et al. | |
| 2004/0249817 A1* | 12/2004 | Liu et al. | 707/9 |
| 2005/0089010 A1* | 4/2005 | Rue et al. | 370/349 |
| 2005/0113070 A1* | 5/2005 | Okabe | 455/411 |
| 2005/0138359 A1 | 6/2005 | Simon | |
| 2005/0184145 A1* | 8/2005 | Law et al. | 235/380 |
| 2005/0201393 A1 | 9/2005 | Hatayama et al. | |
| 2005/0250473 A1* | 11/2005 | Brown et al. | 455/411 |
| 2006/0085352 A1* | 4/2006 | Hug | 705/59 |
| 2006/0094401 A1 | 5/2006 | Eastlake | |
| 2006/0161778 A1 | 7/2006 | Stirbu et al. | |
| 2006/0171540 A1* | 8/2006 | Lee et al. | 380/277 |
| 2006/0215593 A1 | 9/2006 | Wang et al. | |
| 2006/0256733 A1 | 11/2006 | Bejerano | |
| 2007/0050129 A1 | 3/2007 | Salmre | |
| 2007/0081543 A1 | 4/2007 | Brenes et al. | |
| 2007/0104215 A1 | 5/2007 | Wang et al. | |
| 2007/0127503 A1 | 6/2007 | Zhao | |
| 2007/0147241 A1 | 6/2007 | Wang et al. | |
| 2007/0157313 A1* | 7/2007 | Denton | 726/22 |
| 2007/0178884 A1 | 8/2007 | Donovan et al. | |
| 2007/0195702 A1 | 8/2007 | Yuen et al. | |
| 2007/0200914 A1 | 8/2007 | Du Mas | |
| 2007/0230438 A1 | 10/2007 | Jayapalan et al. | |
| 2007/0254677 A1 | 11/2007 | Venkitaraman et al. | |
| 2008/0007485 A1* | 1/2008 | Saitou | 345/5 |
| 2008/0037442 A1 | 2/2008 | Bill | |
| 2008/0039130 A1 | 2/2008 | Acampora | |
| 2008/0112363 A1* | 5/2008 | Rahman et al. | 370/331 |
| 2008/0112371 A1 | 5/2008 | Joshi | |
| 2008/0163336 A1* | 7/2008 | Feng et al. | 726/1 |
| 2008/0189544 A1* | 8/2008 | Raghunath et al. | 713/156 |
| 2008/0227462 A1 | 9/2008 | Freyman et al. | |
| 2009/0022115 A1 | 1/2009 | Berzin et al. | |
| 2009/0055649 A1* | 2/2009 | Takata et al. | 713/171 |
| 2009/0060200 A1* | 3/2009 | Sheu et al. | 380/278 |
| 2009/0147702 A1 | 6/2009 | Buddhikot et al. | |
| 2009/0213824 A1 | 8/2009 | Chen | |
| 2009/0303902 A1 | 12/2009 | Liu et al. | |
| 2009/0303921 A1 | 12/2009 | Manchanda et al. | |
| 2010/0080200 A1 | 4/2010 | Stewart | |
| 2010/0083303 A1 | 4/2010 | Redei et al. | |
| 2010/0188971 A1 | 7/2010 | Chiang | |
| 2010/0189011 A1 | 7/2010 | Jing et al. | |
| 2010/0189029 A1 | 7/2010 | Jing et al. | |
| 2010/0191968 A1 | 7/2010 | Patil et al. | |
| 2010/0202345 A1* | 8/2010 | Jing et al. | 370/328 |
| 2010/0232317 A1 | 9/2010 | Jing et al. | |
| 2010/0257363 A1* | 10/2010 | Kiran et al. | 713/169 |
| 2010/0271945 A1* | 10/2010 | Clave et al. | 370/230.1 |
| 2010/0283579 A1 | 11/2010 | Kraus et al. | |
| 2011/0021150 A1 | 1/2011 | Lin | |
| 2011/0211565 A1 | 9/2011 | Jing et al. | |
| 2011/0211566 A1 | 9/2011 | Jing et al. | |
| 2011/0280156 A1 | 11/2011 | Jing et al. | |
| 2014/0039680 A1* | 2/2014 | Angle et al. | 700/259 |
| 2014/0068036 A1* | 3/2014 | Patil et al. | 709/222 |

FOREIGN PATENT DOCUMENTS

| | | |
|---|---|---|
| KR | 100499122 | 7/2005 |
| WO | WO2004017552 | 2/2004 |
| WO | 2005109754 A1 | 2/2005 |
| WO | WO-2006098723 | 9/2006 |
| WO | 2008002718 A2 | 1/2008 |

OTHER PUBLICATIONS

Naouel Ben Salem et al., "Secure Wireless Mesh Networks", Laboratory of Computer Communications and Applications (LCA), Apr. 6, pp 1-10 (4), EPFL—Lausanne, Switzerland, http://www.ele.uri.edu/nest/readinglist/Securing_Wireless_Mesh_Networks.pdf.

Helen Tang et al., "Strong Authentication for Tactical Mobile Ad Hoc Networks", Jul. 2007, pp. 1-53, Defence R & D Canada—Ottawa: Technical Memorandum DRDC Ottawa TM 2007-146.

Jean-Pierre Hubaux, "Peer-to Peer Security in Wireless Ad Hoc Networks", pp. 1-45, EPFL—Eroffnungskolloquium des Sonderforschungsbereich 627 Nexus, http://lcawww.epfl.ch/hubaux/Talks/Stuttgart.ppt.

"United States Patent and Trademark Office—Non-Final Office Action Dated Aug. 24, 2010", U.S. Appl. No. 12/402,413.

Hong, et al. "A Base-station Centric Data Gathering Routing Protocol in Sensor Networks Useful in Home Automation Applications," IEEE Transactions on Consumer Electronics, vol. 53, Issue 3, Aug. 2007, pp. 945-951 (Abstract only, 1 page).

"United States Patent and Trademark Office—Non-Final Office Action Dated Jan. 20, 2011", U.S. Appl. No. 12/791,386.

Benveniste, Mathilde, Express Forwarding: A Distributed QoS MAC Protocol for Wireless Mesh; MESH 2008, Cap Esterel, France.

Michael R. Souryal et al. "Real-Time Deployment of Multihop Relays for Range Extension", Wireless Communication Technologies Group, National Institute of Standards and Technology, Gaithersburg, Maryland, USA, 2007 copyright Association for Computing Machinery, pp. 85-98.

United States Patent and Trademark Office—Non-Final Office Action Dated Aug. 19, 2010, U.S. Appl. No. 12/360,821.

"United States Patent and Trademark Office—Final Office Action Dated Jun. 24, 2011", U.S. Appl. No. 12/791,386.

Auto IP Collision Detection and Resolution for Multi-Hop Sony Mesh Network with Link Failures (Sony Electronics Proprietary) 1 page.

*Auto IP Slide Show (Sony Electronics Proprietary)* 5 pages.

PCT/US2010/021082 Notification Concerning Transmittal of International Preliminary Report on Patentability (Chapter 1 of the Patent Cooperation Treaty); Date of mailing Aug. 11, 2011.

International Search Report and Written Opinion of the International Searching Authority Dated Oct. 12, 2010 International Asslication No. PCT/US2010/023242.

International Search Report and Written Opinion of the International Searching Authority Dated Aug. 23, 2010, International Application No. PCT/US2010/021685.

United States Patent and Trademark Office—Office Action Dated Oct. 4, 2011, U.S. Appl. No. 12/367,184.

Johnson, et al., "DSR: The Dynamic Source Routing Protocol for Multi-Hop Wireless Ad Hoc Networks", *Ad Hoc Networking, Charles Perkins, ed.*, Chapter 5, pp. 139-172, Addison-Wesley, 2001.

(56) References Cited

OTHER PUBLICATIONS

Peng, et al., "A Wireless MAC Protocol with Collision Detection", *IEEE Transactions on Mobile Computing*, vol. 6, No. 12, Dec. 2007, pp. 1357-1369.
Shai Halevi et al. "Public-Key Cryptography and Password Protocols." ACM Transactions on Information and System Security, Aug. 1999, vol. 2,No. 3, pp. 230-268 See figs. 1-2 and pp. 239-242.
Carl M. Ellison, "Home Security." Intel Technology Journal, Nov. 12, 2002, vol. 6, Issue 4, pp. 37-48, ISSN 1535-766X. See pp. 39, 41-42, 46-47.
"International Search Report and Written Opinion of the International Searching Authority Dated Aug. 5, 2010", International Application No. PCT/US2010/021082.
U.S. Appl. No. 12/367,184, Non-Final Office Action, mailed May 4, 2012.
U.S. Appl. No. 13/191,328 Office Action dated Oct. 4, 2013.
United States Patent and Trademark Office—Office Action (U.S. Appl. No. 13/102,976) dated Mar. 7, 2013.
United States Patent and Trademark Office—Office Action (U.S. Appl. No. 13/191,328) dated Apr. 1, 2013.
Office Action for Japanese application JP 2011-548033 dated May 14, 2013 (with English translation).
Halevi, Shai et al., "Public-Key Cryptography and Password Prtocols", ACM Transactions on Information and System Security, vol. 2, No. 3, Aug. 1999, pp. 230-268.
Aljindi, Mohamad et al., "Autonomic Security for Home Networks", First International Workshop, IWSOS 2006 and Third International Workshop on New Trends in Network Architectures and Services, EuroNGI 2006 Passau, Germany, Sep. 2006, Proceedings.
Written Opinion of the International Searching Authority dated Aug. 23, 2010 for International Application No. PCT/US2010/021685 filed Jan. 21, 2010.
Written Opinion of the International Searching Authority dated Oct. 12, 2010 for International Application No. PCT/US2010/023242 filed Feb. 4, 2010.
Office Action dated Jun. 27, 2011 for U.S. Appl. No. 12/360,824, filed Jan. 27, 2009.
Final Office Action dated Nov. 2, 2012 for U.S. Appl. No. 12/367,184, filed Feb. 6, 2009.
Office Action dated Aug. 13, 2013 for U.S. Appl. No. 13/102,976.
Office Action dated Jul. 30, 2013 for U.S. Appl. No. 13/102,974.
Office Action dated Jul. 8, 2013 for U.S. Appl. No. 13/191,328.

* cited by examiner

AUTHENTICATION FOR A MULTI-TIER WIRELESS HOME MESH NETWORK

FIELD

The invention relates generally to the field of wireless device connectivity. More particularly, one or more of the embodiments of the invention relate to a method and apparatus for authenticating wireless nodes prior to joining a multi-tier wireless home mesh network.

BACKGROUND

A wireless network can provide a flexible data communication system that can either replace or extend a wired network. Using radio frequency (RF) technology, wireless networks transmit and receive data over the air through walls, ceilings and even cement structures without wired cabling. For example, a wireless local area network (WLAN) provides all the features and benefits of traditional LAN technology, such as Ethernet and Token Ring, but without the limitations of being tethered together by a cable. This provides greater freedom and increased flexibility.

Currently, a wireless network operating in accordance with the Institute of Electrical and Electronic Engineers (IEEE) 802.11 Standard (e.g., IEEE Std. 802.11a/b/g/n) may be configured in one of two operating modes: infrastructure mode and ad hoc mode. As of today, most installed wireless networks are configured and operate in infrastructure mode where one or more access points (APs) are configured as interfaces for a wired distribution network (e.g., Ethernet). In infrastructure mode, mobile devices with wireless connectivity (e.g., laptop computer with a radio network interface card "NIC") are able to establish communications and associate with the AP, and thus, the users of these devices are able to access content within servers connected to the wired network.

As an optional feature, however, the IEEE 802.11 Standard specifies ad hoc mode, which allows the radio NIC within each wireless device to operate in an independent basic service set (IBSS) network configuration. Hence, the wireless devices perform peer-to-peer communications with each other instead of utilizing the AP for supporting such wireless communications. The ad hoc mode also allows users to spontaneously form a wireless LAN. For example, a group of employees with laptops implemented with IEEE 802.11 wireless chipsets may gather at a coffee house and form a small WLAN by switching their NICs to ad hoc mode. As a result, the employees could share presentation charts and spreadsheets without the need for cabling or an AP.

One type of ad hoc network is referred to as a mesh network, which allows for continuous connections and reconfiguration around broken or blocked paths by "hopping" from device to another device until the destination is reached. Mesh networks differ from other networks in that the devices can all connect to each other via multiple hops without an infrastructure (e.g., an AP), and these devices can be mobile or stationary. Related to mesh networks, mobile ad-hoc networks (MANETs) are self-configuring networks of mobile routers, where the routers are free to relocate.

One of the primary advantages of mesh networks (and MANETs) is their ability to extend the range of the wireless network. For example, a user on one side of the building can send a packet destined to another user on the far side of the facility, well beyond the point-to-point range of IEEE 802.11-compliant AP, by having the radio signal hop from one mobile device to mobile device until the radio signal gets to its targeted destination. This can extend the range of the WLAN from hundreds of feet to miles, depending on the concentration of wireless users.

With recent technology advances in integrated circuits, and breakthroughs in multiple input and multiple output (MIMO) systems, wireless digital communications have entered a new era that allows faster speed for wireless networking applications. Mobile devices such as smart phones, music/movie players, personal digital assistants, gaming devices and the like, are creating a demand for new wireless communication and networking technologies to allow seamless connection of wireless mobile devices within a home network that not only support high-bandwidth demanding applications such as high-definition (HD) videos, but also relies on manufacturer compatibility between the wireless devices to mitigate interloper and rogue network activity.

BRIEF DESCRIPTION OF THE DRAWINGS

The present invention is illustrated by way of example, and not by way of limitation, in the figures of the accompanying drawings and in which.

DETAILED DESCRIPTION

In the following description, for the purposes of explanation, numerous specific details are set forth in order to provide a thorough understanding of the present invention. It will be apparent; however, to one skilled in the art that present invention may be practiced without some of these specific details. In addition, the following description provides examples, and the accompanying drawings show various examples for the purposes of illustration. However, these examples should not be construed in a limiting sense as they are merely intended to provide examples of embodiments of the invention rather than to provide an exhaustive list of all possible implementations. In other instances, well-known structures and devices are shown in block diagram form in order to avoid obscuring the details of the disclosed features of various described embodiments.

System Architecture

In the following description, certain terminology is used to describe certain features of the invention. For instance, the term "wireless node" is generally defined as an electronic device with data processing and wireless communication capabilities. The term "WHMN-enabled" is generally used to describe a characteristic of a wireless node as being manufactured, endorsed and/or sold by the same entity or group of entities, or permitted access to a restricted ad hoc network that collectively features such wireless nodes such as a Sony® BRAVIA® digital television, Sony® Playstation 3® game console, Sony® VAIO® computer, or other Sony® stationary and handheld devices as illustrated in FIG. 1.

The term "logic" is generally defined as hardware and/or software configured to perform one or more functions. One example of a certain type of logic is a wireless chipset being one or more integrated circuits operating to access a wireless network and/or authenticate a wireless node before granting access to the wireless network. "Software" is generally describes as a series of executable instructions in the form of an application, an applet, or even a routine. The software may be stored in any type of machine readable medium such as a programmable electronic circuit, a semiconductor memory device such as volatile memory (e.g., random access memory, etc.) and/or non-volatile memory such as any type of read-only memory (ROM) or flash memory, a portable storage medium (e.g., USB drive, optical disc, digital tape), or the like.

The term "message" represents information configured for transmission over a network. One type of message is a frame that is generally defined as a group of bits of information collectively operating as a single data unit. The term "content" includes video, audio, images, data files, or any combination thereof.

Figure 1:
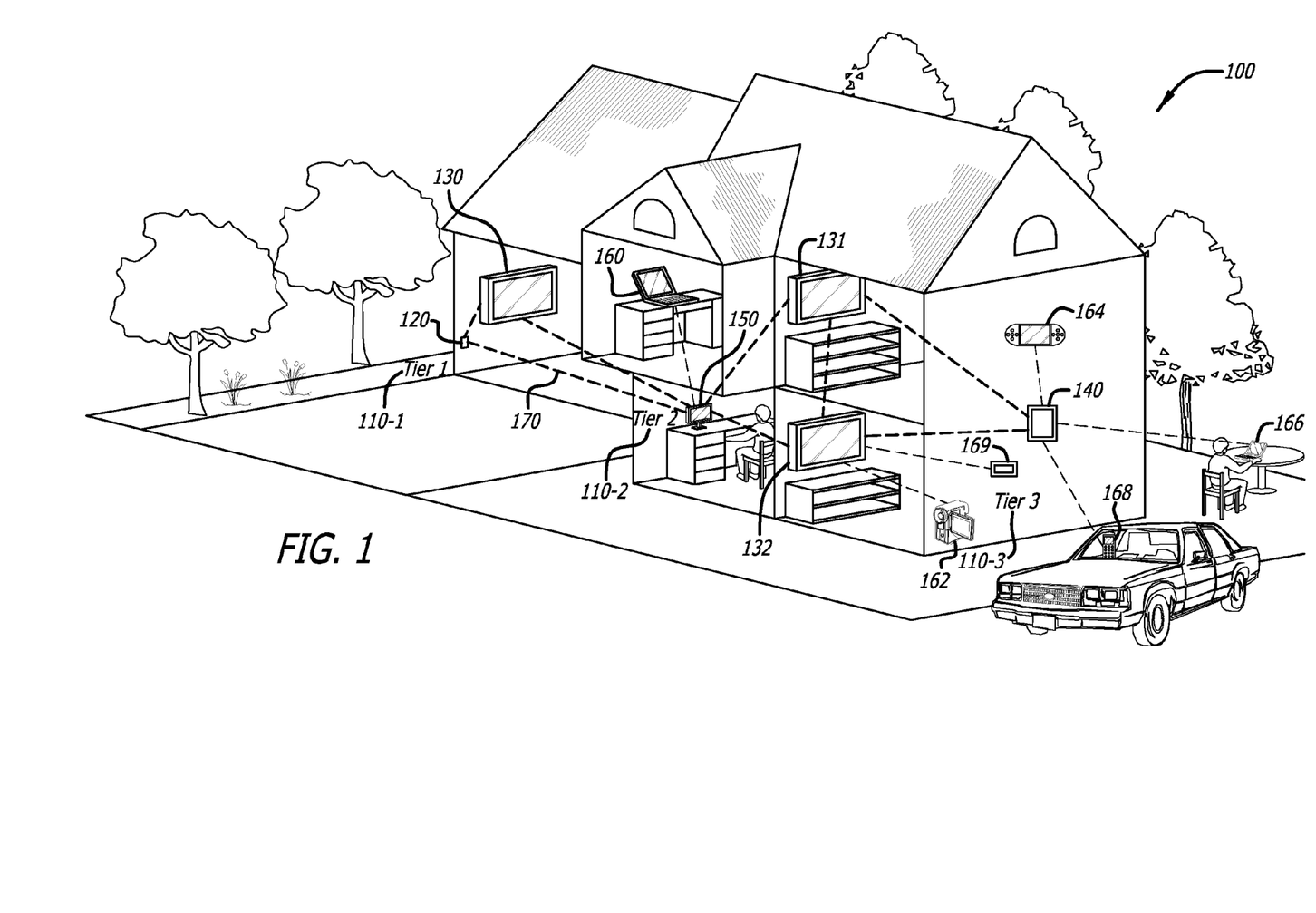
FIG. 1 is a block diagram illustrating an embodiment of a three-tier wireless ad hoc home mesh network (WHMN).

Referring to FIG. 1, an exemplary embodiment of a multi-tier wireless home mesh network 100 is described. Multi-tier wireless home mesh network 100 (hereinafter referred to as "WHM network" or "WHMN" 100) comprises a collection of nodes that operate as a decentralized, wireless home mesh network with multiple (N≥1) sub-networks $110_1$-$110_N$ (hereinafter singularly referred to as "tiers") that are responsible for different functions within WHM network 100. Hence, mostly every node of WHM network 100 is configured to forward data to other nodes and is assigned to a specific tier based on its performance capabilities and power constraints. The assignment of a node to a tier is a decision based on performance capabilities of the node, whereas routing decisions are made by the nodes based on the network connectivity and the ability to forward data by that particular node.

For instance, one embodiment of WHM network 100 features a hierarchical architecture comprising three (3) tiers that are assigned based on the capabilities of the node. A first tier ("tier 1") $110_1$ is responsible for establishing and controlling access to an external network such as the Internet. For example, first tier $110_1$ may resemble a traditional Internet connection via a cable or direct subscriber line (DSL) connection or 3G/WiMax/Outdoor mesh. As illustrated, first tier $110_1$ comprises a first node 120, which is commonly referred to as a "gateway node." Gateway node 120 may include, but is not limited or restricted to a cable or DSL modem, a wireless router or bridge, and the like. Although not shown, multiple gateway nodes may be present within WHM network 100 in order to provide multiple communication paths to external network(s).

A second tier ("tier 2") $110_2$ of WHM network 100 may represent a wireless network backhaul that interconnects various stationary (fixed-location) wireless nodes such as stationary (fixed-location) electronics devices adapted for communicating over a wireless communication medium such as, for example, radio frequency (RF) waves. As described herein, an "electronics device" may be stationary or mobile. A "stationary electronics device" includes, but is not limited or restricted to: a flat-panel television (130, 131, and 132), a gaming console (140), desktop computer (150), or any other device that is usually stationary and is electrically coupled to an AC power outlet. Hence, stationary electronics devices are not subject to power constraints that are usually present in mobile nodes where power usage is minimized to extend battery life between recharges.

Referring still to FIG. 1, a third tier ("tier 3") $110_3$ of WHM network 100 may include links between a wireless node belonging to second tier $110_2$ and one or more mobile nodes (160, 162, 164, 166, 168 & 169). A "mobile node" may include any battery powered electronics device with wireless connectivity including, but is not limited to a laptop computer, handheld device (e.g., personal digital assistant, ultra mobile device, cellular phone, portable media player, wireless camera, remote control, etc.) or any non-stationary consumer electronics devices. Since mobile nodes normally have resource constraints (e.g., limited power supplies, limited processing speeds, limited memory, etc.), third tier $110_3$ may provide reduced network services. In one embodiment, mobile nodes of WHM network 100 may act as a slave or child connecting directly to a tier-2 node, which may further limit their functionality within WHM network 100.

Below, Table 1 summarizes a multi-tier, wireless home mesh network architecture, categorization by potential network characteristics, tier node descriptions and traffic type that is prevalent over WHM network 100.

TABLE 1 multi-tier wireless home mesh network scenario

| | | Characteristics | Examples |
|---|---|---|---|
| Network | Dimension | ~50 × 60 sq ft; 1-2 stories or high-rising building | House Apartment building Business |
| | Node Number | Tier 2 - 3~10; Tier 3 - 5~20 | 2 TVs, 1 desktop computer, 1 PS3; 2 laptops, 4 mobile phones, 4 media players, . . . |
| | Distribution | Indoor, 3D, Non-LOS, link distance 15~60 ft | Uniformly distributed Tier-2 nodes, clustered Tier 3 |
| Node Type (per Tier Network) | Tier-1 | Usually one or two Tier 1 nodes | Cable/DSL modem, WiMax/3G, Outdoor Mesh |
| | Tier-2 | Fixed location, power-sufficient (TX power 100 mW-1 W) | TV, desktop computer, gaming console (e.g. PS3), etc. |
| | Tier-3 | Mobile, power-limited (TX power 1-100 mW) | Laptop, mobile phone, portable media player, wireless camera, remote |
| Traffic | HD video streaming | ~30 Mbps compressed | 1080p/i, 720p/i, 480p/i quality HD videos |
| | SD Video/Audio streaming | ~100k-1 Mbps video, 32k-256 kbps audio | Internet video clip (e.g. YouTube ®), webcam output, mp3 audio, voice |
| | Data | Bursty transmission, ~20 Mbps for certain user satisfaction | http type data (web browsing) |

As indicated by Table 1, WHM network 100 is distinct from conventional mesh-network solutions because WHM network 100 is directed to consumer electronics (CE) devices and video-centric applications. Based on the traffic indicated in Table 1, which may include high-definition (HD) video, audio clips and video clips, as well as user data, wireless NICs may be incorporated within some of the stationary nodes of the WHM network 100. For example, by multiplexing one flow of compressed HD video, four Internet video sessions plus four audio/video sessions and some intermittent http data traffic, the load on the backhaul link 170 is approximately 60 megabits per second for TCP/UDP type traffic, which may require at least 100 megabits per second of raw radio support considering media access control (MAC) layer efficiency. According to this example, the tier-2 nodes might require an 802.11n type radio (e.g., at 5 GHz band) to meet such a bandwidth requirement.

Figure 2:
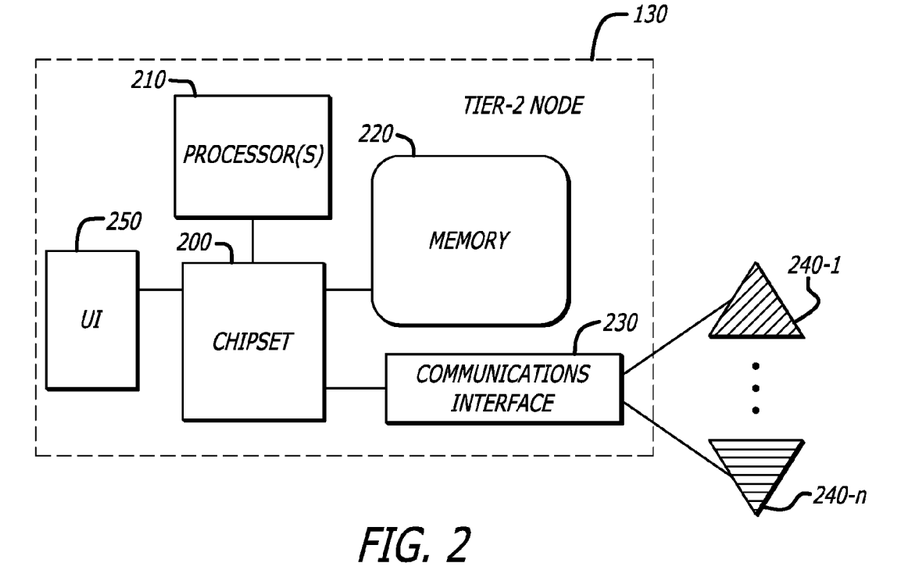
FIG. 2 is a block diagram illustrating an embodiment of a tier-2 node within a WHMN.

Referring now to FIG. 2, an exemplary embodiment of tier-2 node 130 is shown. Herein, tier-2 node 130 comprises an embedded wireless network chipset 200 that includes one or more processors 210, memory 220, a communications interface 230 and a user interface (UI) 250. According to this embodiment, processor(s) 210 are adapted to initiate and process request messages to join WHM network 100 of FIG. 1, as well as to authenticate a node requesting to join the network even if it is already a part of WHM network 100. These messages are transmitted and received over communications interface 230, which may include one or more antennas $240_1$-$240_N$ (N≥1) that are controlled by processor 210 or dedicated circuitry (not shown) to tune and receive incoming wireless signals on a particular channel and to transmit outgoing wireless signals to other nodes over that particular channel.

Referring back to FIG. 1, prior to communicating data, tier-2 node 130 associates with another node that is already part of WHM network 100. After an association is established, tier-2 node 130 and another tier-2 node 150 can exchange data. The association process is a two step process involving three states: (1) unauthenticated and unassociated; (2) authenticated and unassociated; and (3) authenticated and associated. To transition between the states, the communicating parties exchange messages called management frames. In operation, all nodes are adapted to transmit one or more management frames, referred to as a Neighbor Discovery Request messages, to determine if there are any nodes that can decode the message and respond in a timely manner.

Before conducting operations to associate (join) WHM network 100, tier-2 node 130 listens for response messages to a Neighbor Discovery message in order to identify what other nodes are within range and in communication over what channel. After identifying node 150, nodes 130 and 150 may perform a mutual authentication through the exchange of several management messages. After successful authentication, tier-2 node 130 moves into the second state authenticated and unassociated. The authentication and discovery techniques are described in more detail in FIGS. 7-9.

Figure 3:
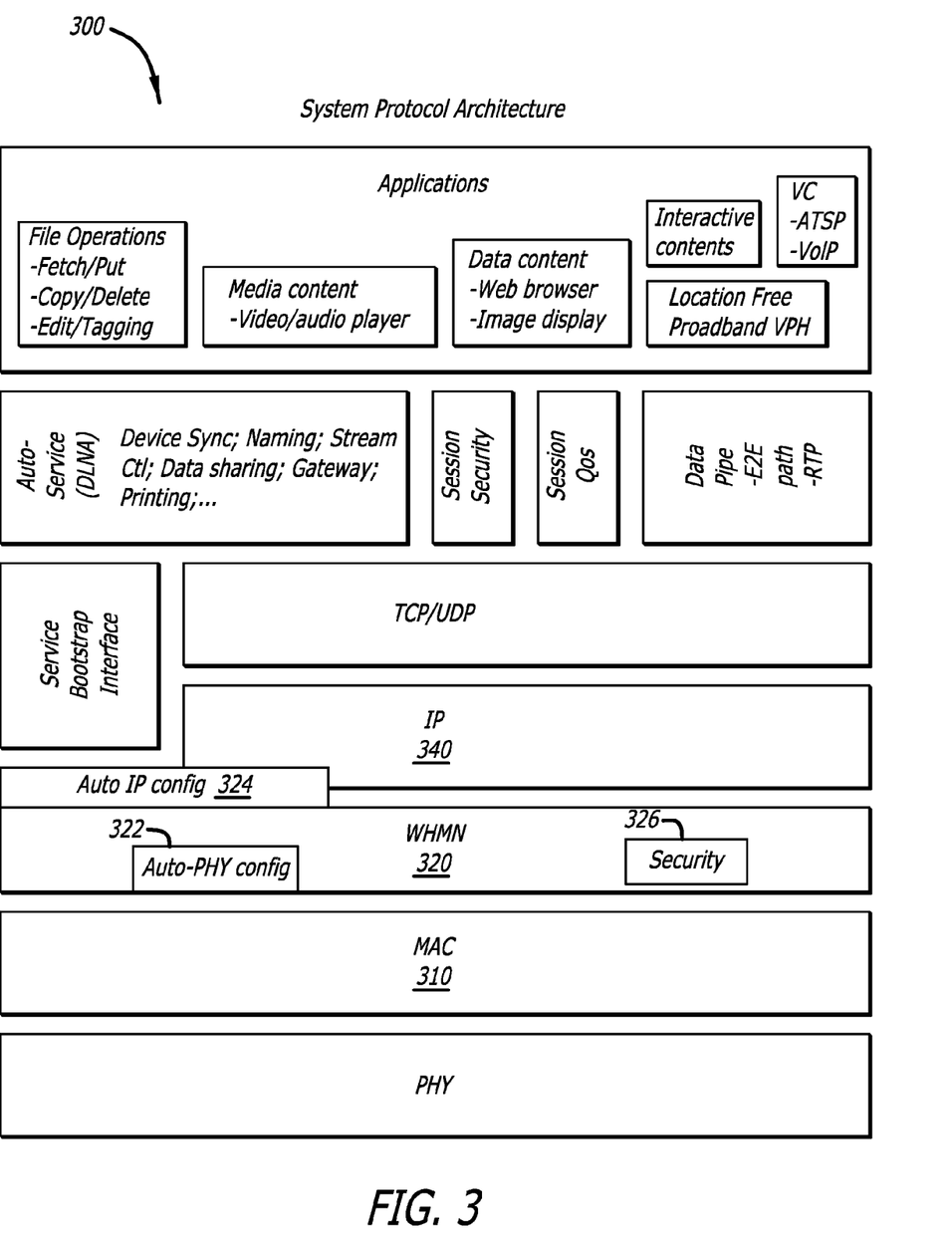
FIG. 3 is a block diagram illustrating an embodiment of a wireless ad hoc home network protocol architecture.

Referring now to FIG. 3, a block diagram shows one embodiment of an Open Systems Interconnection (OSI) layer representation of the system protocol architecture 300 for a node within WHM network 100 is shown. This protocol architecture 300 is provided to achieve a self-organizing, self-configuring home network where different functions or features are designed or enhanced to current wireless network architectures built upon TCP/IP/802.11.

To enable wireless home mesh network functions, a single WiFi radio platform may be used. For example, for tier-2 nodes, one IEEE 802.11a/b/g/n, dual-band card (mini PCI, USB dongle, or the like) is used for backhaul links to operate at a 5 GHz band or higher bandwidth. In one embodiment of the invention, links connecting tier 3 nodes are compatible with legacy 802.11b/g mode simply because, at this time, most current mobile nodes support IEEE 802.11b/g WiFi. Of course, the particular wireless PHY and MAC layers may be altered accordingly.

As shown in FIG. 3, in the protocol architecture 300 described, wireless home mesh network ("WHMN") functions 320 are placed between MAC layer 310 and network (IP) layer 340 to provide a solution that is independent of the higher OSI layers deployed and can be more easily reconfigured. Representatively, in system protocol architecture 300 of FIG. 3, enhanced functionality is placed in WHMN layer 320 between MAC layer 310 and a Network (IP) layer 340. Hence, WHMN layer 320 generally constitutes an "OSI layer 2.5" solution. The placement of WHMN layer 320 provides enhanced functionality that is transparent to both lower and higher OSI layers, and different radio chipsets can be supported. WHMN layer 320 carries functions for network security as described below.

In one embodiment of the invention, WHMN functions layer 320 is transparent to both lower and higher layers, to enable support for different radio chipsets. The WHMN layer 320 can perform functions of WHMN software organization and configuration such as auto-PHY (network discovery) configuration 322, auto-IP addressing 324, security 326 such as node authentication and the like. In one embodiment, the auto-IP addressing function 324 may provide automated IP address generation once an electronic device has been authenticated and joined an identified WHMN.

Figure 4:
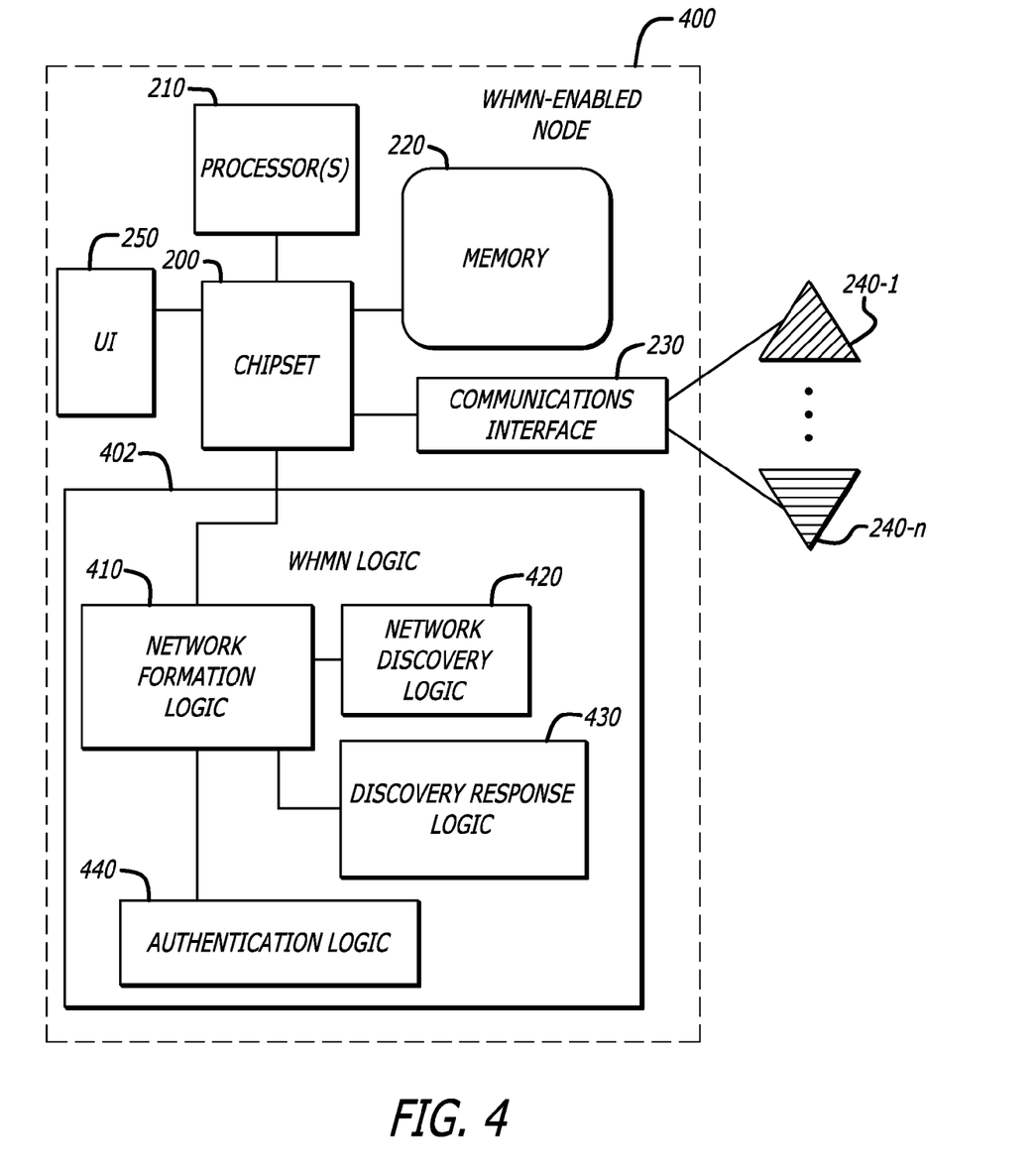
FIG. 4 is a block diagram illustrating an embodiment of a wireless home electronics device configured to implement a WHMN.

As illustrated in FIG. 4, a wireless node that is WHMN-enabled, such as an OEM electronics device 400, includes a processor 210 which uses wireless chipset 200 to access memory 220 and communications interface 230. Communications interface 230 may include one or more tunable antennas $240_1$-$240_N$. In contrast to conventional electronics devices, device 400 further includes wireless ad hoc home network ("WHMN") logic 402. WHMN logic 402 includes network formation logic 410, network discovery logic 420, discovery response logic 430 and authentication logic 440.

In one embodiment, when WHMN-enabled node 400 is powered on, network discovery logic 420 may scan each channel to detect the presence of other WHM networks. According to the IEEE 802.11 Standard, when a wireless card operates in an ad hoc mode, various devices send out messages in a predefined manner according to the ad hoc mode. In one embodiment, when a WHMN is established, including at least one stationary node, the stationary node will periodically transmit a beacon to maintain standard ad hoc operations.

Figure 7:
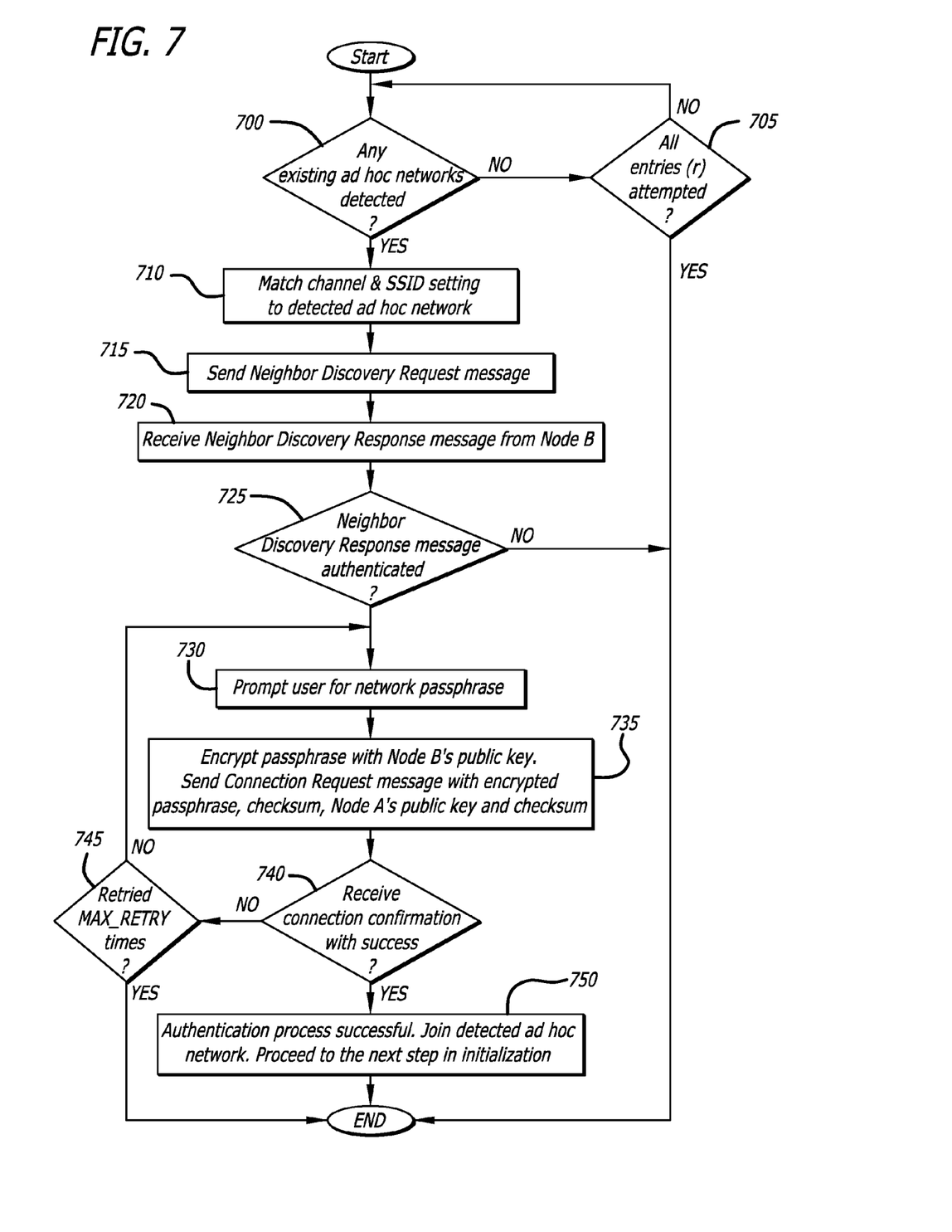
FIG. 7 illustrates an embodiment of the process flow for WHMN detection and authentication using a user password between a new node (Node A) and an existing node (Node B).
Figure 8:
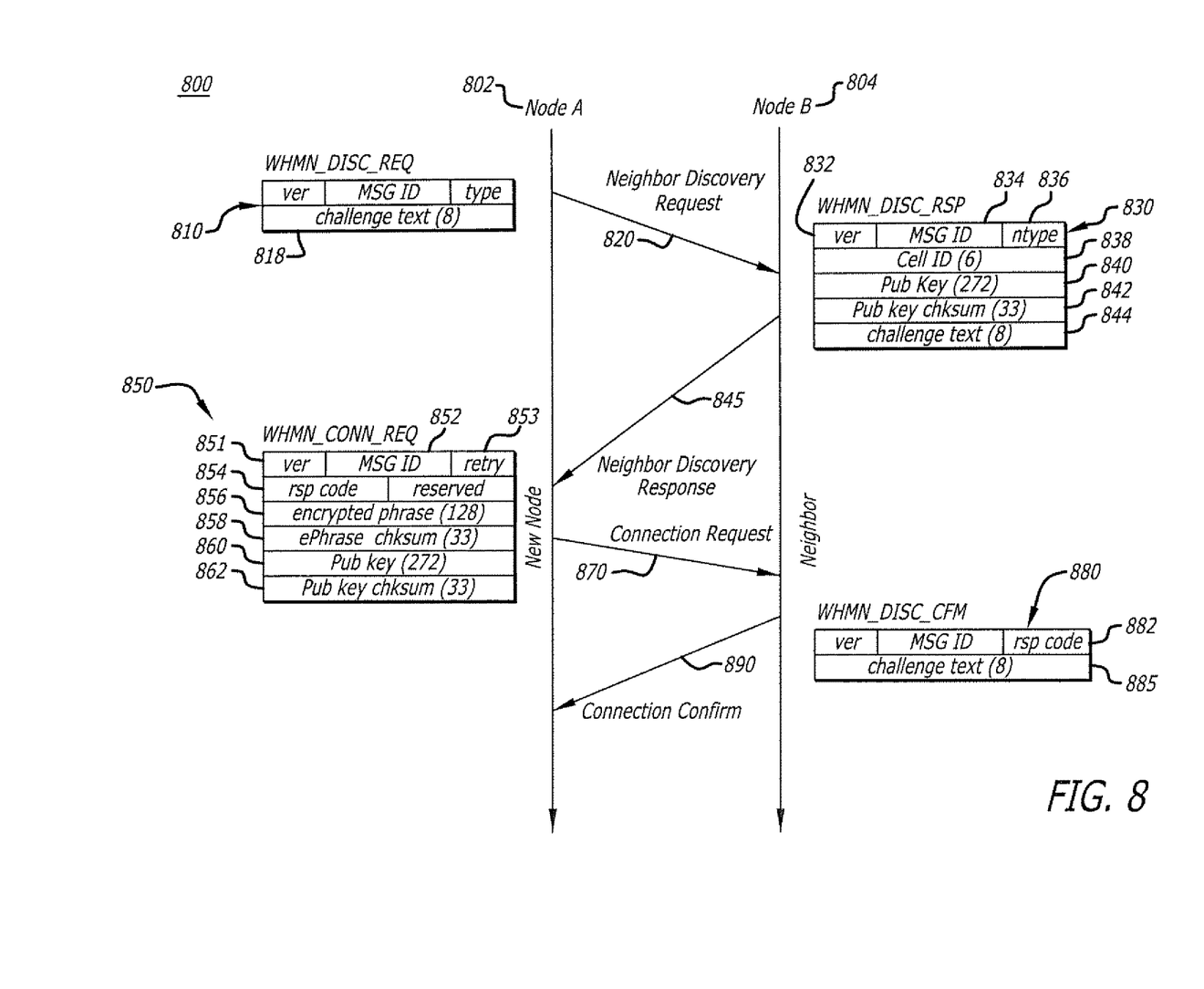
FIG. 8 illustrates an embodiment of a message flow diagram: this is performed by a wireless node that desires to join a WHMN and a responding (existing) node of the WHMN.
Figure 9:
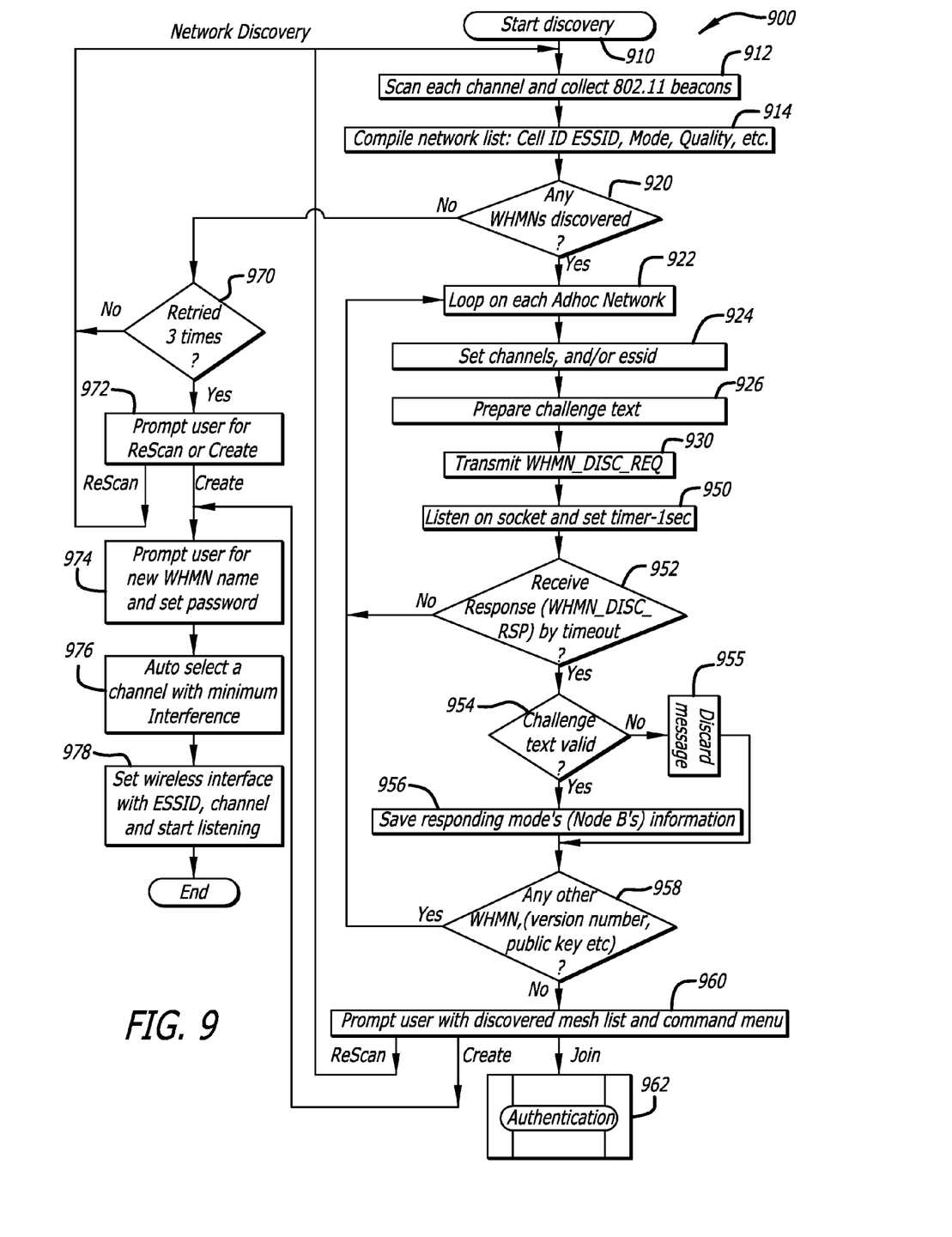
FIG. 9 is a flow chart illustrating an embodiment of a method for formation of a multi-tier WHMN.

Activation of WHMN-enabled node 400 may trigger network discovery logic 420 to issue one or more 802.11 "ad hoc" functions to scan each wireless channel to determine a list of available WHM networks. Based on the detected signals (e.g., beacons), network discovery logic 420 may identify one or more wireless networks that are operating in an ad hoc mode. The network discovery logic 420 may transmit one or more security parameters to detect a WHM network from one or more identified wireless ad hoc networks. These security parameters may enable an existing node within the WHM network to verify WHMN-enabled node 400 as an electronics device from the same OEM. Discovery response logic 430 may respond to a network discovery request when device 400 is a node of a WHMN. An authentication process, as shown in FIGS. 7-9, may be performed by authentication logic 440.

Referring again to FIG. 4, in one embodiment, if WHMN-enabled node 400 does not detect the presence of a WHMN, network formation logic 410 may enter a network initiator phase to establish node 400 as either a mobile node or a stationary node for a WHMN. For example, referring again to FIG. 1, flat-panel television (TV) 130 may initially become a first stationary node for WHMN 100 of FIG. 1. According to such an embodiment, TV 130 will include a radio NIC which will periodically emit a beacon to enable identification of WHMN 100 by any newly-added electronics devices. For example, desktop computer 150, upon activation, may detect the presence of WHMN 100 based on a response received from TV 130 in response to a connection request message, which is organized based on a proprietary format as shown in FIG. 5.

System Functionality

Figure 5:
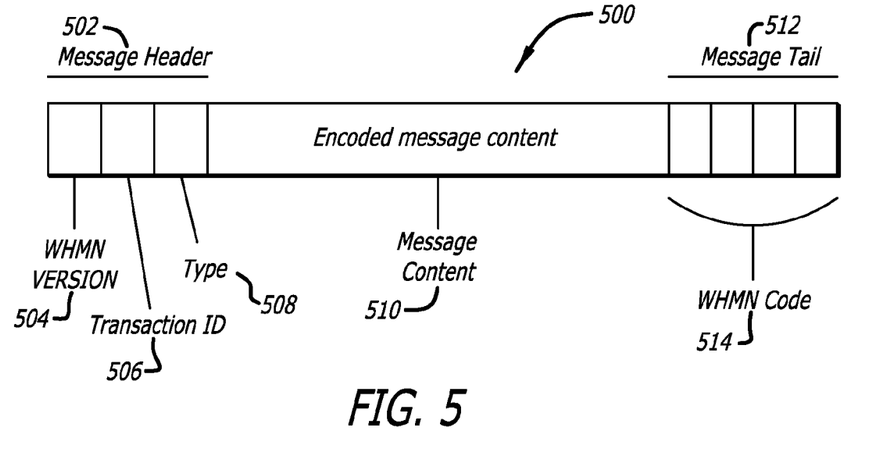
FIG. 5 illustrates a generic WHMN message packet format according to one embodiment of the invention.

FIG. 5 illustrates an exemplary format of a WHMN message 500, which is representative of a messaging format that WHMN-enabled node 400 of FIG. 4 uses for initial WHMN setup. For example, during a discovery phase where nodes analyze their wireless environment, each new wireless node may run a network scan (using standard 802.11 functions) to find all wireless networks in its neighborhood. The new node then transmits a message as a broadcast or multicast to all identified WHM networks in an attempt to identify a WHMN in its neighborhood. Existing nodes of a WHMN respond to the Discovery message with appropriate details necessary to establish a new connection.

More specifically, as shown in FIG. 5 as an illustrative embodiment, WHMN message 500 may include (i) a message header 502, (ii) message content 510, and (iii) a message tail 512. Herein, according to this exemplary embodiment, message header 502 includes a WHMN version 504, a transaction (message) ID 506 that identifies the particular message, a type parameter 508 indicates a type of node transmitting the message (e.g., tier-1, tier-2 or tier-3). Message content 510 may include encoded data that is used to protect the data from interlopers and to ensure that the data is accessible only by the targeted wireless node. Message tail 512 includes a WHMN code 514. In one embodiment of the invention, each WHMN message ends with a WHMN code 514 that may be repeated a predetermined number of times to ensure that an entire message is received without error.

Figure 6:
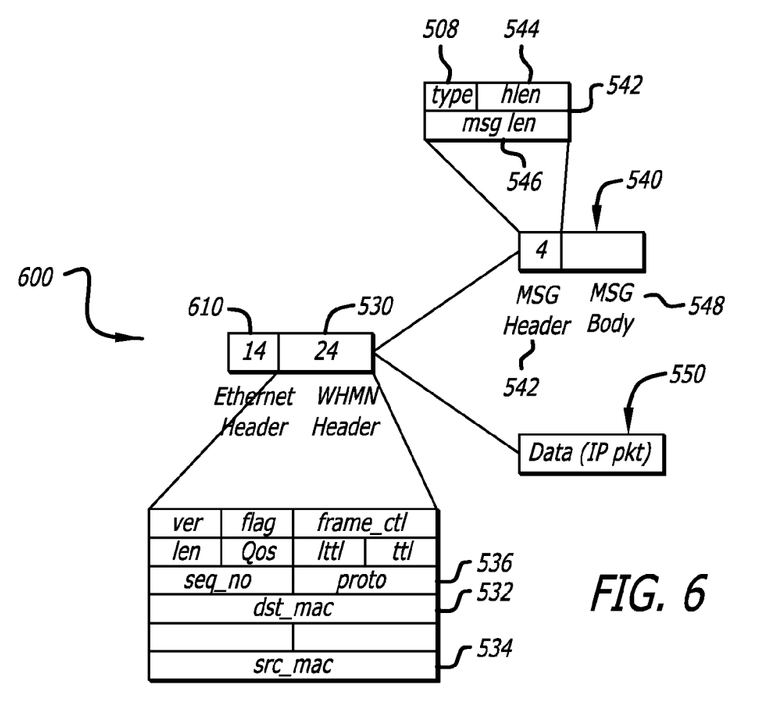
FIG. 6 illustrates an embodiment of an implementation (using Ethernet packet) of a generic WHMN message packet format according to one embodiment.

As an example, FIG. 6 illustrates exemplary formats of two types of WHMN message 500, namely WHMN data messages 550 and WHMN control messages 540. Herein, according to this embodiment of the invention, both WHMN data message 550 and WHMN control message 540 are routed by encapsulating these messages within an Ethernet packet 600 that includes a 24-byte WHMN header 530 inserted after an Ethernet header 610. WHMN header 530 includes a destination MAC address (dst_mac) 532 to identify a destination for WHMN message 500 and a source MAC (src_mac) address 534 to identify a source of WHMN message 500. Other information 536 also may be placed within header 530 including, but not limited to a protocol version number that identifies a version of the system protocol architecture, a control flag, a frame type as being data or control, a frame length, a QoS feature, a Time-to-Live (TTL) value that specifies how long (in hops) the message is allowed to "live" on the network where each hop causes the TTL value to be reduced by one, a sequence number that indicates the sequence of the frame within a complete message transaction, and a data protocol type.

For WHMN control messages (e.g. Discovery, Authentication, etc.), 4-byte control header 542 is inserted after header 530, where control header 542 includes type 508 as well as header length 544 and message length 546. After control header 542, a message body (content) 548 of WHMN control message 540 is inserted. For Discovery messages, for instance, message body 548 is a "challenge text" as described below.

In contrast, for WHMN data messages 550, an IP data packet received from the OSI network layer is attached to Ethernet packet 600 after WHMN header 530 in lieu of control header 542 and message body 548.

FIG. 7 illustrates a process flow for network detection and authentication using user a password between a new node (Node A) and an existing node (Node B). First, a determination is made whether there are any existing ad hoc networks detected (block 700). For instance, according to one embodiment of the invention, when Node A is powered on, it scans each wireless channel to detect the presence of other ad hoc networks and optionally categories the potential ad hoc networks based on signal strength (stronger RSSI first).

Given the growing popularity of wireless networks, there is a good chance that the scan result would detect the presence of several ad hoc networks in the vicinity of Node A. However, in order to accommodate for message loss, the wireless node employs a message timer/retry mechanism that is configured to retry scanning for each wireless channel as needed, for up to r times where r≥1 (block 705). Where a requesting node does not receive any replies before the timer expires "r" times, no WHM networks are determined to be communicating over a particular channel.

Upon detecting ad hoc networks, Node A configures itself to match the channel and SSID settings of each such network and sends a Neighbor Discovery Request message (blocks 710 and 715). According to one embodiment of the invention, Neighbor Discovery Request message is a broadcast message that a node sends out in an attempt to find and join existing OEM-specific mesh networks as well as build a neighbor table including information concerning the detected nodes and their ad hoc networks. The Neighbor Discovery Request message includes a security field and a node type as illustrated in FIG. 8. The security field contains $2^k$-bits, where k≥5 (e.g., $2^6$ or 64-bits). These 8-bytes are derived from a proprietary function that is utilized by a specific OEM, using a secret value (e.g., a bitwise value or alphanumeric characters that may operate as secret text) and the ESSID of the network that Node A is trying to join. The "node type" parameter lets the receiving node (Node B) know about Node A's capabilities.

| #define GATEWAY | 1 | /*node type - GATEWAY*/ |
| #define STATIONARY | 2 | /*node type - Tier-2 Stationary (default)*/ |
| #define MOBILE | 3 | /*node type - Tier-3 Mobile*/ |

In the event that the security field does not match the expected result at the receiving node, the Neighbor Discovery Request message is not processed further so that no response is generated. However, if a match is detected, the receiving node (Node B) associated with the WHM network transmits a Neighbor Discovery Response message to Node A (block 720). As illustrated in FIG. 8, this message contains the network (and cell) ID, security key and other parameters required by Node A to join the WHM network. Furthermore, the Neighbor Discovery Response message includes (i) a security field that includes a value based on the secret value and the MAC address of the responding node (Node B), (ii) a public key of the responding node (Node B), and for additional protection, (iii) a checksum of this public key. According to one embodiment of the invention, the keys (public/private pair) for the nodes are generated using OpenSSL (RSA keys). The checksum for the public key is also generated using OpenSSL functions (MD5 sum). According to one embodiment of the invention, this key and checksum generation may occur at manufacturer and at initialization of the node.

Upon receiving the Neighbor Discovery Response message, Node A checks the integrity of the message by comparing the received checksum with the locally generated checksum for the received public key (block 725). Once the checksum is validated, Node A stores the public key, MAC address and other details for Node B. Thereafter, the process now moves to the Authentication phase.

During the authentication phase, the user is prompted to enter a network pass-phrase (block 730). This pass-phrase is encrypted using the Node B's public key and then is sent along with a checksum of the encrypted pass-phrase, Node A's public key and a checksum of Node A's public key (block 735) within a Connection Request message.

Upon receiving the Connection Request message, the Node B checks for integrity by examining the encrypted pass-phrase checksum values. Node B then decrypts the encrypted pass-phrase and then checks for the integrity of the received public key. If the integrity check passes, Node B will compare the decrypted pass-phrase with its own pass-phrase. Thereafter, Node B would send the Connection Confirm message with a response code (blocks 740 and 750). The response code serves as a feedback to Node A that its request has been received with success or failure. The following gives a list of error codes.

```
#define CONN_SUCCESS        0
#define PASSCODE_FAILED     1
#define ENC_CHKSUM_ERR      2
#define PUBKEY_CHKSUM_ERR   3
#define UNKNOWN_ERR         4
```

The timeout and retry values for connection authentication process may be set as follows to set wait times for the Connection Confirm message and the number of retries for such transmissions (block 745):

```
#define TIMEOUT_CONN_REQ   5   /*5 seconds*/
#define MAX_CONN_RETRY     3
```

FIG. 8 illustrates one embodiment of a message flow diagram 800, performed by a wireless node that desires to join a WHMN and a responding (existing) node of the WHMN. As shown in FIG. 8, the wireless node is referred to as "Node A" 802 and the responding wireless node is referred to as "Node B" 804, respectively. FIG. 8 illustrates a message (WHMN Neighbor Discovery Request) 810 that Node A 802 transmits to one or more detected wireless ad hoc networks. This transmission may be in a broadcast or multicast manner. The Neighbor Discovery Request message (WHMN_DISC_REQ) 810 is sent out in an attempt to find an existing WHMN from the detected wireless ad hoc networks. Neighbor Discovery Request message 810 is proprietary to the WHMN and will be recognized by other WHMN-enabled OEM wireless nodes in the neighborhood. In one embodiment, Neighbor Discovery Request message 810 may include a security field 818 to protect the WHMN from denial-of-service (DOS) attack from non-OEM/non-WHMN-enabled devices.

In one embodiment, security field 818 includes a challenge text, namely a secret value combined with the current timestamp, an extended service set identification (ESSID) and cell ID of a network that Node A 802 is attempting to join. The "combination" may be implemented as a one or more Exclusive OR (XOR) operations, a concatenation, hash, or any arithmetic or logical operation on the data forming the secret value. The secret value may be persistently stored within memory or ROM of Node A 802, or may be generated based upon a proprietary seed value that is utilized by the particular OEM. Upon scanning wireless channels and upon detecting Neighbor Discovery Request message (see arrow 820), Node B 804 may verify that the challenge text 818 matches an expected value. Presuming challenge text 818 is verified to identify Node A 802 as a WHMN-enabled OEM wireless node, Node B 804 will generate a Neighbor Discovery response (WHMN_DISC_RSP) 830 and initiate a unicast transmission to Node A 802 as shown in FIG. 8.

As further shown in FIG. 8, Neighbor Discovery Response message 830 may include a version number of mesh software 832; a message identifier (e.g., response) 834; a type identifier 836 to identity the tier level of Node B 804; a node identifier (cell ID) 838; a public key 840 of Node B; a checksum 842 of public key 840 (public key checksum 842); and challenge text 844. Public key 840 is used in the connection phase. Public key checksum 842 is added to mitigate undetected corruption or tampering with public key 840, which is most likely need in a man-in-the-middle attack. Public key checksum 842 may be computed as a hash result computed by hashing public key 840 using MD-5 or another hashing function. Challenge text 844 is a combination of the MAC address of Node A and the secret value.

In one embodiment, receipt of the Neighbor Discovery Response message (see arrow 845) indicates to Node A 802 that a detected ad hoc network is identified as a WHMN. Based on the identification of a WHMN, Node A 802 may save various information regarding Node B 804. Node A 802 may repeat this process to identify multiple WHMNs, which may be presented to the user as a list, with a user selection required to join a desired network. Based on a user pass-phrase for a selected WHMN, Node A 802 generates a Connection Request message 850 (see arrow 870) for transmission to Node B 804. Connection Request message 850 provides version number 851, message identifier 852, retry value 853, response code 854 as defined above. Additionally, Connection Request message 850 provides information for authentication of Node A, including the encrypted pass-phrase 856, a checksum of the encrypted pass-phrase 858, a public key of Node A 860 and a checksum of this public key 862.

Node B 804 generates Connection Confirmation message 880 if the connection request is validated as described above with the response code 882 to identify failure or success of such validation (see arrow 890). Connection Confirmation message 880 includes a challenge text 885 in order to prevent attacks where an erroneous (or fake) confirmation is sent. Since challenge text 885 is generated using an OEM-specific secret value (e.g., a logical value associated with the manufacturer), it will also serve to differentiate products provided by the manufacturer and those products that are not. The authentication process for generating the Connection Request message 850 and Connection Confirmation message 880 is further described in FIG. 9. Procedural methods for implementing one or more embodiments are now described.

FIG. 9 is an additional flow chart illustrating a method 900 for formation of a multi-tier wireless home mesh network with a secure network discovery protocol, according to one embodiment of the invention. The discovery may be performed within a wireless home mesh network (WHMN), for example, as depicted in FIG. 1, utilizing an OEM/WHMN-enabled electronics device as described in FIG. 4, in accordance with one embodiment.

As shown in FIG. 9, the secure network discovery protocol begins with a node (Node A) performing a WHMN discovery operation according to one embodiment of the invention. More specifically, at process blocks 910 and 912, each channel is scanned by Node A to detect the presence of existing ad hoc networks. Such detection may be accomplished by detecting wireless signals, and based on these wireless signals, determining which wireless nodes are in range. For instance, according to one embodiment of the invention, based on such wireless signals, at process block 914, a network list is compiled including a cell ID, an ESSID, mode, quality, and the like. The wireless signals may include, but are not limited or restricted to IEEE 802.11 beacons. Based on the detected information, Node A determines whether a WHMN is discovered (process block 920). When a WHMN is not discovered, in one embodiment, as shown in process block 970, the discovery operation may be retried until a user is prompted either to create (initiate) a WHMN, or perform a rescan. This process for performing network initiation is shown at process blocks 974-978.

More specifically, when a WHMN is not discovered at process block 920, Node A may perform a predetermined number of retries such as, for example, three retries (process block 970). Following the predetermined number of retries, at process block 972, Node A may prompt the user to rescan for available wireless networks by returning to process block 912. However, if the user desires to enter network initiation mode, to create a new WHMN, the flow continues to process block 974. At process block 974, a user is prompted for a name and password for the new WHMN. At process block 976, a channel with, for example, minimal interference is selected. Once selected, a wireless interface of the network may be set to an extended service set identifier (ESSID) and a channel is set for the WHMN according to the selected channel so that the Node A may begin listening for discovery requests.

Referring again to process block 922, for each detected WHMN that may be sorted based on signal strength, Node A performs process blocks 924-956. At process block 924, Node A sets its information to the parameters of a detected WHMN (e.g., channel number and SSID settings). At process block 926, Node A prepares challenge text as described above. At process block 930, Node A transmits a Neighbor Discovery Request message (WHMN_DISC_REQ) to the detected WHMN.

Following the transmission, at process block 950, Node A listens on a socket for a predetermined period of time. At process block 952, it is determined whether a timeout is detected. When a timeout is detected, the discovery process returns to process block 922 as shown.

As shown in one embodiment of the invention, if a response is received prior to the timeout, response verification is performed at process block 954. Based on the response verification, at process block 956, the identified node and information of the identified node is saved. Otherwise, the message (response) is discarded at process block 955. For each WHMN identified from one or more detected WHMNs, the device may present a list of such WHMNs to a user, and prompt a user either to join a selected WHMN, create a new WHMN, or perform a rescan (process blocks 958, 960 and 962). If the user desires to join a WHMN, the device performs an authentication process at process block 962 to establish itself as either a stationary node or a mobile node of a WHMN. The authentication involves the exchange of the Connection Request (WHMN_CONN_REQ) message and the Connection Confirmation (WHMN_DISC_CFM) message as shown in FIG. 8.

Hence, in summary, during a network discovery phase, a new wireless node sends transmit messages to each open mesh network on each channel in an attempt to find a WHMN for a predetermined OEM of the node. If the node receives a Neighbor Discovery Request message on its broadcast port, it may respond with a Neighbor Discovery Response message. The Neighbor Discovery Response message contains unique parameters about the network. These unique parameters are encoded in a proprietary format so that only OEM devices can decode and use the messages to establish a connection with an existing WHMN. Following network discovery, the node can send a Connection Request message with necessary network parameters and connection phrase. If the parameters are correct and properly received, the neighboring node responds with a Connection Confirmation message, and if authentication successful, allows the wireless network to join the OEM-specific WHMN.

Alternate Embodiments

Of course, although not shown, when a node decides to leave the network, it transmits (broadcasts or multicasts) a Disconnect message. Neighboring wireless nodes that receive a Disconnect message will remove the node from their Netlist table. To protect against fake Disconnect messages originating from non-OEM devices, the Disconnect message would include a $2^k$-bit security field, which is a 64-bit security field for this embodiment. The 8-bytes are derived from a proprietary logic functions that is OEM-specific. The inputs to the logic are the secret value and MAC address of the sending wireless node.

Another aspect of our design involves encrypting the Hello messages at the routing layer with the network passphrase. The network passphrase acts as a means to differentiate between two mesh networks which may use the same network ID (for example, two neighbors using the default network setup). Since the passphrase protection is implemented at the mesh layer (i.e., OSI Layer 2.5), it is possible for two networks with the same network ID to receive hello messages from each other. This can cause inconsistency between the neighbor table at the mesh and routing layer. In order to prevent two different networks from accepting each other's Hello messages, Hello messages are encrypting using the network's pass-phrase. With such an encryption at OSI Layer 3, a received Hello message that doesn't pass the pass-phrase test is dropped thus keeping the neighbor tables across the two layers consistent with each other.

Several aspects of one implementation of the wireless home mesh network for providing improved home electronic device connectivity are described. However, various implementations of the wireless home mesh network provide numerous features including, complementing, supplementing, and/or replacing the features described above. These features can be implemented as part of wireless nodes in different embodiment implementations. In addition, the foregoing description, for purposes of explanation, uses specific nomenclature to provide a thorough understanding of the embodiments of the invention. However, it will be apparent to one skilled in the art that the specific details are not required in order to practice the embodiments of the invention.

Having disclosed exemplary embodiments and the best mode, modifications and variations may be made to the disclosed embodiments while remaining within the scope of the embodiments of the invention as defined by the following claims.

What is claimed is:

1. A method comprising:
discovering a wireless home mesh network in response to activation of a wireless node; and
authenticating the wireless node before permitting the wireless node to join the wireless home mesh network by:
(1) transmitting a first message, the first message including (i) an encrypted pass-phrase being a pass-phrase encrypted with a public key of the wireless node of the wireless home mesh network, (ii) a checksum of the encrypted pass-phrase, (iii) the a public key of the wireless node, and (iv) a checksum of the public key of the wireless node; and
(2) receiving a second message, the second message including a code to indicate whether the wireless node has been successfully authenticated;
transmitting a third message, the third message including a first challenge text including a secret value combined with an extended service set identification (ESSID) of the wireless home mesh network; and
receiving a fourth message from a node of the wireless home mesh network, the fourth message including a second challenge text including the secret value combined with a media access control (MAC) value of the wireless node.

2. The method of claim 1, wherein the transmitting of the third message is a broadcast of a Neighbor Discovery Request message, the Neighbor Discovery Request message includes the challenge text and a node type to identify one of a plurality of node types established based on capabilities of the wireless node, the plurality of node types include a mobile node type being an electronic device with battery power capabilities and a stationary node being an electronic device without battery power capabilities.

3. The method of claim 2, wherein the receiving of the fourth message includes a receipt of a unicast Neighbor Discovery Response message from the node of the wireless home mesh network, the Neighbor Discovery Response message includes a node type to identify one of a plurality of node types of the node, a public key of the node and a checksum of the public key of the node.

4. The method of claim 1, wherein the transmitting of the first message is a broadcast of a Connection Request message, the Connection Request message further includes a retry value to indicate a number of retries in transmitting the Connection Request message if no acknowledgement message is received.

5. A method, comprising:
establishing a gateway node, communicably coupled to an external network, as a first tier of a wireless home mesh network;
classifying one or more stationary electronics devices into a second tier of nodes partially forming the wireless home mesh network;
classifying one or more mobile electronic devices into a third tier of nodes partially forming the wireless home mesh network; and
wirelessly communicating with a node being part of the wireless home mesh network that, before permitting a wireless node to join the wireless home mesh network, authenticates the wireless node by (1) transmitting a first message that includes (i) an encrypted pass-phrase being a pass-phrase encrypted with a public key of the wireless node being part of the wireless home mesh network, (ii) a checksum of the encrypted pass-phrase, (iii) the public key of the wireless node being part of the wireless home mesh network, and (iv) a checksum of the public key of the wireless node being part of the wireless home mesh network, and
(2) receiving a second message, the second message including a code to indicate whether the wireless node has been successfully authenticated, wherein before wirelessly communicating with the node, the method further comprises discovering the wireless home mesh network by
transmitting a third message, the third message including a first challenge text including a secret value combined with an extended service set identification (ESSID) of the wireless home mesh network, and
receiving a fourth message from the node of the wireless home mesh network, the fourth message including a second challenge text including the secret key combined with a media access control (MAC) value of the wireless node.

6. The method of claim 5, wherein the second tier of nodes include a digital television.

7. The method of claim 5, wherein the second tier of nodes further include a video game system.

8. The method of claim 5, wherein the transmitting of the third message is a broadcast of a Neighbor Discovery Request message, the Neighbor Discovery Request message includes the challenge text and a node type to identify one of a plurality of node types established based on capabilities of the wireless node, the plurality of node types include a first node type being the mobile electronic device with battery power capabilities and a first node type being the stationary electronic device without battery power capabilities.

9. Adapted for communications with a node of an ad hoc network, a wireless node comprising:
a processor;
a chipset coupled to the processor;
a communications interface coupled to the chipset; and
a logic unit coupled to the chipset, the logic unit including an authentication logic to authenticate the wireless node through use of a first message including an encrypted pass-phrase, a checksum of the encrypted pass-phrase, a public key of the wireless node, and a checksum of the public key of the wireless node, the processor configured for:
receiving an authentication message, the authentication message including a code to indicate whether the wireless node has been successfully authenticated;
transmitting a challenge message, the challenge message including a first challenge text including a secret value combined with an extended service set identification (ESSID) of the network; and
receiving a MAC challenge message from a node of the network, the MAC challenge message including a second challenge text including the secret value combined with a media access control (MAC) value of the wireless node.

10. The wireless node of claim 9, wherein the logic unit further comprises:
a network formation logic to establish the wireless node as either a mobile node or a stationary node,
a network discovery logic to scan each channel to detect a presence of an ad hoc network, and a discovery response logic to respond to a network discovery request.

11. The wireless node of claim 9, wherein the challenge text returned in the authentication message includes an original equipment manufacturer (OEM)-specific secret value being a logical value associated with a manufacturer.

12. The wireless node of claim 11, wherein the challenge text includes the OEM-specific secret value combined with other information associated with the wireless node.

13. The wireless node of claim 11, wherein the challenge text includes the OEM-specific secret value combined with the other information associated with the wireless node being a Media Access Control (MAC) address of the wireless node.

* * * * *